UNITED STATES PATENT OFFICE.

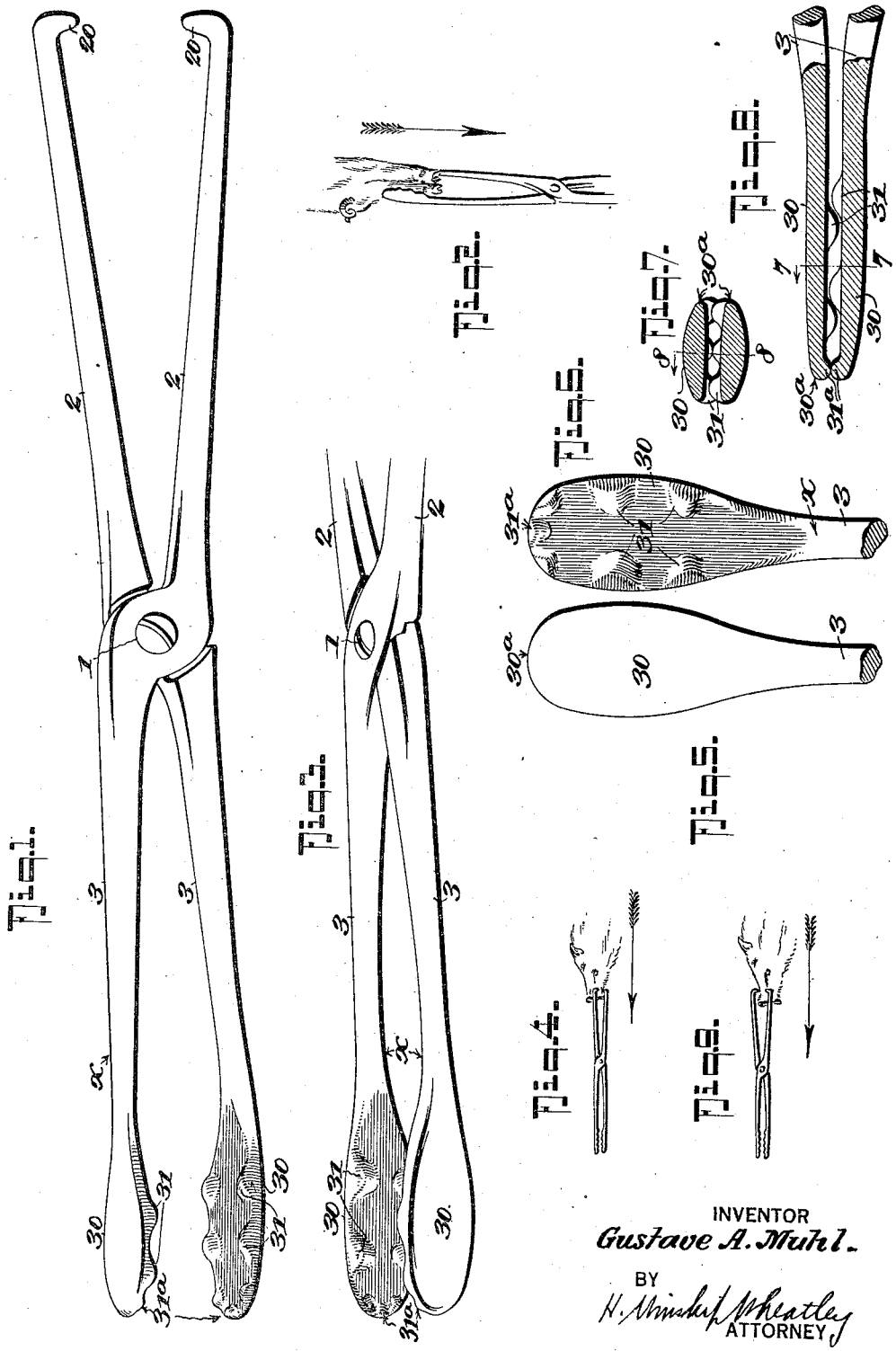

GUSTAVE A. MUHL, OF TORONTO, IOWA.

PIG'S FORCEPS.

1,277,243. Specification of Letters Patent. Patented Aug. 27, 1918.

Application filed November 5, 1917. Serial No. 200,379.

*To all whom it may concern:*

Be it known that I, GUSTAVE A. MUHL, a citizen of the United States, residing at Toronto, in the county of Clinton and State of Iowa, have invented new and useful Improvements in Pigs' Forceps, of which the following is a specification.

This invention, which generally has reference to forceps used in veterinary obstetrics, more particularly has for its object to provide a new and improved design of forceps of the general character stated of a simple and inexpensive nature, in which the parts are especially arranged and adapted for being conveniently and accurately applied for use for grasping the head or the leg in assisting in the delivery of the animal.

Among other objects, hereinafter to be explained, my invention particularly seeks to provide, in a device of the character mentioned, an improved construction of the opposing clamping or jaw portions that constitute animal gripping members in such manner that when operatively applying the device, either for gripping the head or snout, or the leg of the animal to be delivered, the action of gripping the said animal, either around the head or snout, is unerringly accomplished without the least danger of cutting, tearing, or otherwise damaging the muscles or other parts during the operation of inserting and gripping and pulling operations of the said forceps.

With the above and other objects in view, to be referred to, my invention consists of a pig's forceps that embodies the peculiar and novel arrangement of the parts fully stated in the following description, specifically pointed out in the appended claims and illustrated in the accompanying drawings, in which:

Figure 1 is a perspective view of my improved pigs' forceps, the two members being shown as partly extended.

Fig. 2 is a perspective view that illustrates the manner in which the gripper ends are projected for grasping the leg of the animal when delivered backward.

Fig. 3 is a perspective view of the gripper jaws end of the forceps, the parts being positioned for gripping the legs of the animal.

Fig. 4 is a diagrammatic view that illustrates the manner in which the pulling or knob ends of the forceps are projected for effecting an under-jaw hold on the snout of the animal.

Fig. 5 is a plan view of one of the gripper jaw portions of the forceps.

Fig. 6 is a similar view of the opposite side thereof.

Fig. 7 is a cross section of the head portions of the forceps on the line 7—7 of Fig. 8.

Fig. 8 is a longitudinal section thereof on the line 8—8 on Fig. 7.

Fig. 9 is a diagram that shows the knob ends of the forceps applied for making an upper jaw hold.

In my construction, the forceps comprise two opposing members of like construction, pivotally joined about centrally of their length by a screw connection 1, and the said members, in practice, are preferably made of brass and highly nickeled.

One end 2 of each of the pivotally connected members, from the pivotal connection, gradually taper and are round in cross section at their outer ends, which terminate in inwardly bent right angled knobs 20—20 which, in addition to making strong underjaw, over-jaw and over-head holds, when pulling the animal head first, enable the user to effect a strong pull, without unnecessarily pressing the gripper jaws 30 onto the other ends 3 of the pivoted members 1—1 together when gripping the hind legs of the animal, when delivered backward, as is clearly indicated in Fig. 2.

Forceps of the general character stated heretofore have been open to the objection that the forceps or gripper jaws are usually provided with gripper prongs or teeth, whose formation, as also the formation of the outside faces of the said gripper jaws, is such, that unless the forceps are very carefully handled, they tend to rip or otherwise lacerate the muscles and other parts.

An essential feature of my invention is embodied in the peculiar and symmetrical formation or design of the gripper jaws, so that they will operate with equal effectiveness, whether the instrument is used one side up or the other side up with ordinary care, and the movement of the said jaws in any direction may be readily had without the slightest danger of crushing the legs of the animal or ripping or otherwise damaging the surrounding parts.

Except, as presently referred to, the two opposing members or jaws 30—30, and their respective arms 3—3, of which the jaws are an integral part, are of like shape, as is best shown in Figs. 7 and 8, by reference to which it will be seen the arms 3—3 at their inner or pivot ends are substantially round in cross section, and from such end they gradually taper in thickness to the point indicated by x, from which point the said arms are flattened out to form substantially oval shaped jaws 30—30.

On the inner flat face of each jaw, and located along the outer edge thereof is a series of gripper lugs 31, each of which has a plurality (preferably four) of beveled gripping surfaces, the outer ones 31$^a$ of which are rounded and merge with the rounded edge 30$^a$ of the jaw, as is clearly shown in Figs. 7 and 8, from which it will be seen that the gripper lugs on the opposing jaws are spaced to close between each when the jaws are brought together to thereby provide for getting a firm hold on the leg or head of the pig, and at the same time overcome danger of the forcep jaws slipping and injuring the animal.

As is clearly indicated in the drawings, particularly in Figs. 5-8, the forcep or gripping jaws 30 at no part present a sharp or squared edge, every contact point of the lugs 30$^a$, as also the side and front edges of the said jaws 30, and the penetrating portion of the bars 3—3, being rounded or smooth, thus positively overcoming any danger to the animal in using the forceps, either side up or while manipulating them for the desired position for gripping the animal.

What I claim is:

1. A pig's forceps consisting of pivoted members each including a penetrating portion substantially round in cross section that tapers from near the pivotal end to near the outer end with the said outer end terminating in a flattened clamping jaw that is substantially oval shape in cross section, the said jaw being provided on its clamping face with a series of independent lugs projected at right angles therefrom and located along the outer edge thereof, each of the said lugs having its edges rounded, that face of the lugs adjacent the outer peripheral edge of the jaw merging and being rounded off with the said jaw.

2. An improved forceps of the character stated, consisting of pivoted members each including a penetrating member substantially round in cross section that tapers from near the pivotal end to near the outer end, the said outer end being flattened to form a substantially oval shaped clamping jaw, a series of lugs projected at right angles from the inner face of the jaw, the said lugs being located along the peripheral edge of the jaw, each of the said lugs including a plurality of tapered surfaces, one of which merges and rounds off with the adjacent edge of the jaw, the remaining surfaces of the lugs being rounded and merging with the inner surface of the jaw, the lugs of one jaw being arranged to close between the lugs of the other jaw when the two jaws are close together.

GUSTAVE A. MUHL.

Copies of this patent may be obtained for five cents each, by addressing the "Commissioner of Patents, Washington, D. C."